United States Patent [19]

Jennings et al.

[11] Patent Number: 4,912,918
[45] Date of Patent: Apr. 3, 1990

[54] APRON TENSIONING METHOD FOR ROUND BALERS

[75] Inventors: Richard E. Jennings, Manheim; Robert A. Wagstaff, Lancaster; H. Nevin Lausch, Denver, all of Pa.

[73] Assignee: Ford New Holland, Inc., New Holland, Pa.

[21] Appl. No.: 255,680

[22] Filed: Oct. 11, 1988

[51] Int. Cl.⁴ ............................................. A01D 39/00
[52] U.S. Cl. ......................................... 56/341; 100/88
[58] Field of Search ..................... 56/1, 341, DIG. 2; 100/87, 88, 89

[56] References Cited

U.S. PATENT DOCUMENTS

| | | |
|---|---|---|
| 3,722,197 | 3/1973 | Vermeer . |
| 3,751,890 | 8/1983 | Gay et al. . |
| 3,837,159 | 9/1974 | Vermeer . |
| 3,901,007 | 8/1975 | Blanshine et al. ............... 56/341 |
| 4,103,475 | 8/1978 | Kampman et al. . |
| 4,137,697 | 2/1979 | Knapp et al. . |
| 4,257,219 | 3/1981 | Burrough et al. . |
| 4,273,036 | 6/1981 | Kopaska ........................ 100/88 |
| 4,280,320 | 7/1981 | Eggers . |
| 4,343,141 | 8/1982 | Oellig . |
| 4,426,833 | 1/1984 | Campbell . |
| 4,470,247 | 9/1984 | Mast ............................ 56/341 |
| 4,545,298 | 10/1985 | Viaud . |
| 4,656,820 | 4/1987 | Jennings . |
| 4,698,955 | 10/1987 | Wagstaff . |

FOREIGN PATENT DOCUMENTS

2090560B 10/1985 United Kingdom .

OTHER PUBLICATIONS

John Deere Operator's Manual-430 and 530 Round Balers, pp. 35-4 and 35-5, SP-319 Litho in U.S.A. in Nov., 1984.

*Primary Examiner*—William P. Neuder
*Attorney, Agent, or Firm*—Darrell F. Marquette; Frank A. Seemar; Larry W. Miller

[57] ABSTRACT

A method of tensioning the apron of a round baler includes utilizing a pair of springs and a pair of hydraulic cylinders connected between apron take up arms and a tailgate of the round baler in a manner such that the springs normally urge the apron take up arms toward an inner position whereas the hydraulic cylinders resist movement of the apron take up arms from the inner position to an outer position. The hydraulic cylinders provide a primary source of apron tension and the springs provide a secondary source of apron tension so that, during bale formation, the apron tension generated by the hydraulic cylinders increases while the apron tension generated by the springs remains substantially constant.

1 Claim, 2 Drawing Sheets

4,912,918

APRON TENSIONING METHOD FOR ROUND BALERS

CROSS REFERENCE TO RELATED APPLICATIONS

This application relates to U.S. patent application Ser. No. 186,542 of S. A. Seymour et al filed Apr. 27, 1988 and U.S. patent application Ser. No. 186,984 of R. E. Jennings et al filed Apr. 27, 1988.

BACKGROUND OF THE INVENTION

This invention relates generally to roll baling machines typically referred to as "round balers" which form cylindrical bales of crop material and, in particular, to an apron tensioning method for such machines.

Round balers of the expandable chamber type disclosed in U.S. Pat. Nos. 4,343,141 to F. A. Oellig et al and 4,426,833 to W. R. Campbell have included a bale forming apron which is maintained under tension during bale formation by utilizing coil springs or air springs. One drawback of the coil springs disclosed in the Oellig et al patent is that the tension in the apron cannot be quickly and easily released when servicing the baler. Another drawback of these coil springs is that they are bulky and heavy. The air springs disclosed in the Campbell patent overcome these drawbacks but they are costly and require additional frame structure due to the high forces they exert. Furthermore, adjustability of the air springs is limited to decreasing the apron tension only unless an on-board air supply is included.

SUMMARY OF THE INVENTION

It is an object of the present invention to provide an apron tensioning method for round balers which permits quick and easy release of the tension in the bale forming apron.

Another object of the present invention is to provide an apron tensioning method for round balers which permits the tension in the bale forming apron to be increased and decreased without including an on-board air supply.

The present invention provides a method of tensioning an apron in a round baler having a main frame and a tailgate pivotally connected to the main frame. A sledge assembly is mounted on the main frame for movement between a bale starting position and a full bale position, and the apron is supported on take up means mounted in the main frame. The apron has an expandable inner course which cooperates with the sledge assembly to define a bale starting chamber when the sledge assembly is in the bale starting position. The take up means is movable from an inner position toward an outer position as the inner course of the apron expands. The apron tensioning method comprises utilizing hydraulic means to provide a primary source of tension on the apron and utilizing spring means to provide a secondary source of tension on the apron.

In the preferred embodiment of the present invention, the hydraulic means resists movement of the take up means from the inner position to the outer position, and the spring means normally urges the take up means toward the inner position. The spring means assists the hydraulic means during formation of a bale core in the bale starting chamber and during the final stages of bale formation. The apron tension generated by the hydraulic means increases during bale formation while the apron tension generated by the spring means remains substantially constant during bale formation.

DESCRIPTION OF THE PREFERRED EMBODIMENT

Figure 1:
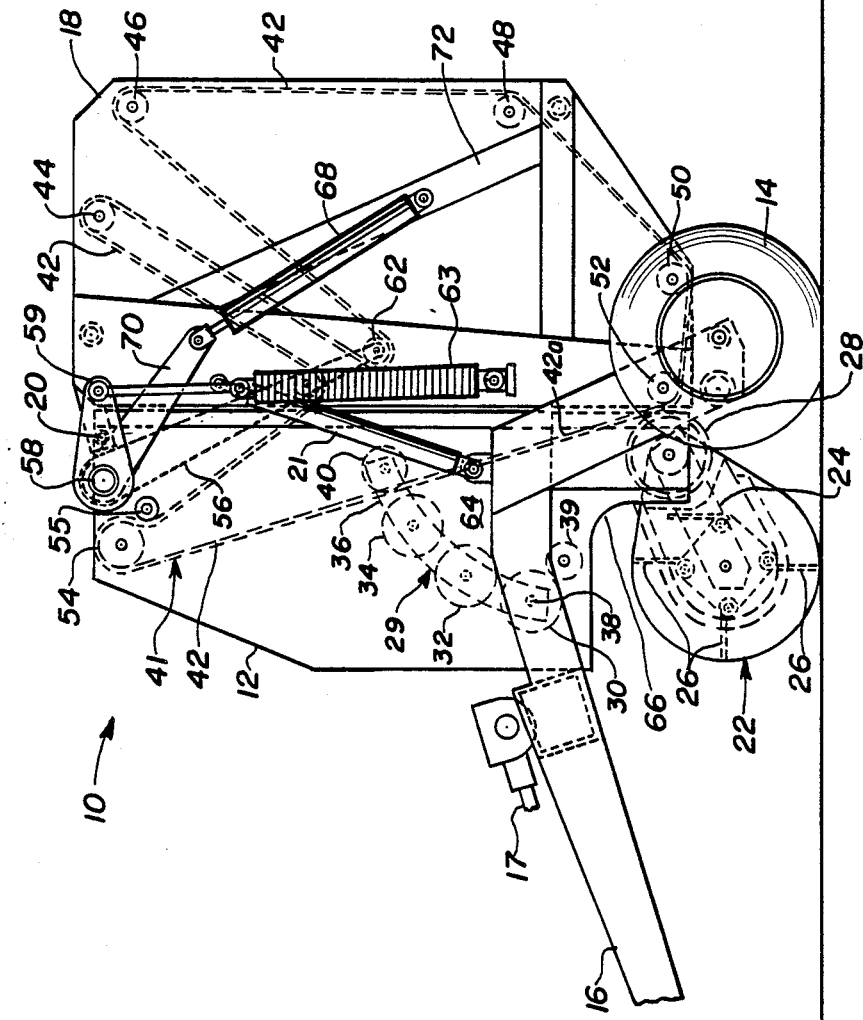
FIG. 1 is a side elevational view of a round baler according to the preferred embodiment of the present invention at the start of bale formation.
Figure 2:
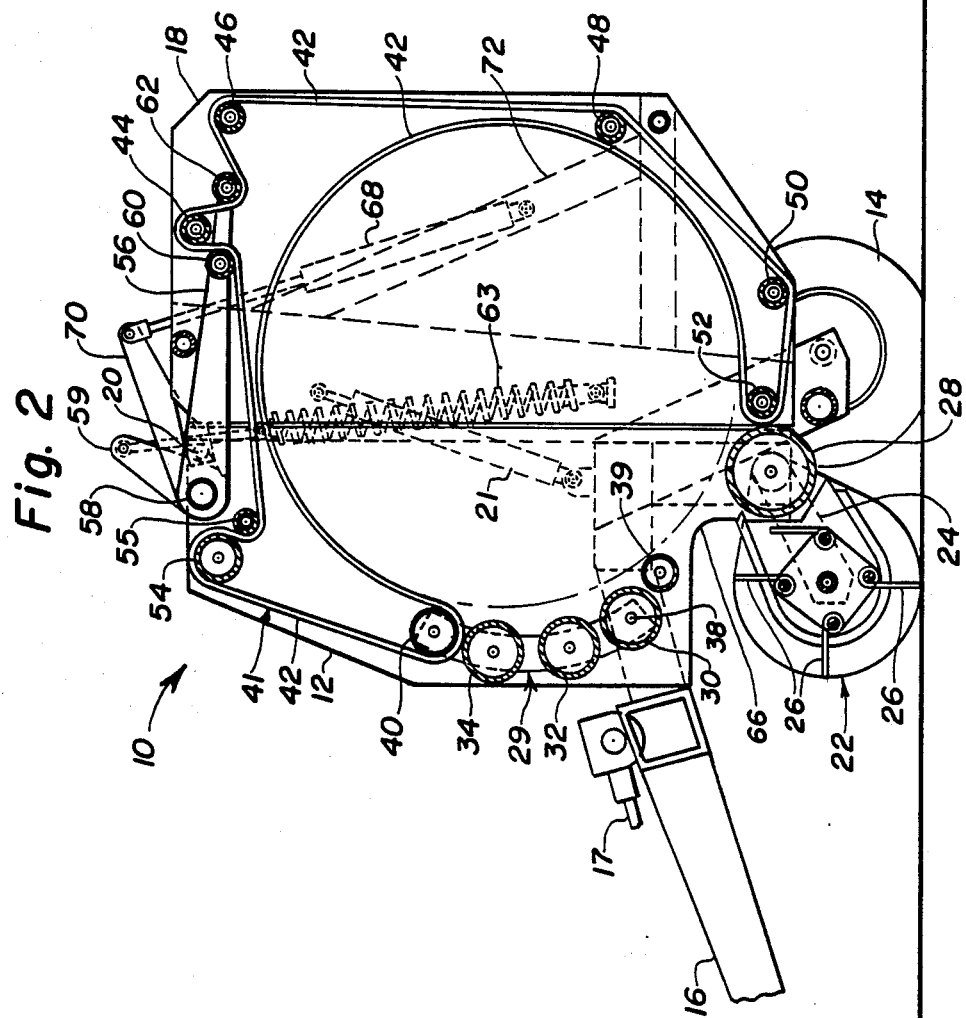
FIG. 2 is another side elevational view of the round baler of FIG. 1 at the completion of bale formation.

Referring to FIGS. 1 and 2, a round baler 10 according to the preferred embodiment of the present invention includes a main frame 12 supported by a pair of wheels 14. A tongue 16 is provided on the forward portion of the main frame 12 for connection to a tractor (not shown). A tailgate 18 is pivotally connected to the main frame 12 by stub shafts 20 so that the tailgate 18 may be closed as shown in FIG. 1 during bale formation and opened to eject a completed bale. A pair of hydraulic cylinders 21 are connected between the main frame 12 and the tailgate 18 to open and close the tailgate 18. A conventional pickup 22 is mounted on the main frame 12 by a pair of brackets 24 and is supported by a pair of wheels (not shown). The pickup 22 includes a plurality of fingers or tines 26 movable in a predetermined path to lift crop material from the ground and deliver it rearwardly toward a floor roll 28 which is rotatably mounted on the main frame 12.

A sledge assembly 29 includes a plurality of rollers 30, 32, 34 extending transversely of the main frame 12 in an arcuate arrangement and journalled at the ends thereof in a pair of arcuately shaped arms 36. The arms 36 are pivotally mounted inside the main frame 12 on stub shafts 38 for permitting movement of the sledge assembly 29 between a bale starting position shown in FIG. 1 and a full bale position shown in FIG. 2. The rollers 30, 32, 34 are driven in a clockwise direction as indicated in FIG. 1 by conventional means (for example, chains and sprockets or gears) connected with a drive shaft 17 which is adapted for connection to the PTO of a tractor (not shown). A stripper roll 39 is located adjacent roller 30 and is driven in a clockwise direction, as viewed in FIG. 1, to strip crop material from the roller 30. An idler roller 40 is carried by the arms 36 for movement in an arcuate path when the sledge assembly 29 moves between its bale starting and full bale positions. The idler roller 40 is freely rotatable.

An apron 41 includes a plurality of belts 42 supported on guide rolls 44, 46, 48, 50, 52 which are rotatably mounted in the tailgate 18 and on a drive roll 54 which is rotatably mounted in the main frame 12. Although the belts 42 pass between the roller 34 and the idler roller 40, they are in engagement with only the idler roller 40 but the roller 34 is located in close proximity to the belts 42 to strip crop material from the belts 42. Further conventional means (not shown) are connected with the drive shaft 17 to provide rotation of the drive roll 54 in a direction which causes movement of the belts 42 along the path indicated in FIG. 1 when starting a bale. An additional guide roll 55 in the main frame 12 ensures proper driving engagement between the belts 42 and the drive roll 54. A pair of take up arms 56 are pivotally mounted on the main frame 12 by a cross shaft 58 for movement between inner and outer positions shown in FIGS. 1 and 2, respectively. Take up arms 56 carry additional guide rolls 60 and 62 for the belts 42. Resilient means such as a pair of springs 63 are provided to normally urge the arms 56 toward their inner positions. Springs 63 are connected at their upper ends to levers 59 which are mounted on the cross shaft 58 and at their lower ends to the tailgate 18.

When the round baler 10 is in the condition shown in FIG. 1 with the tailgate 18 closed, an inner course 42a of the apron belts 42 extending between the guide roll 52 and the idler roller 40 cooperates with the rollers 30, 32, 34 of the sledge assembly 29 to define a bale starting chamber 64. The apron inner course 42a forms a rear wall of the chamber 64 while the rollers 30, 32, 34 form a front wall of the chamber 64. The floor roll 28 is disposed in the bottom of the chamber 64 between the front and rear walls thereof. The roller 30 is spaced from the floor roll 28 to form a throat or inlet 66 for the chamber 64, and the take up arms 56 will be urged into their inner positions shown in FIG. 1 by the springs 63.

As the round baler 10 is towed across a field by a tractor (not shown), the pickup tines 26 lift crop material from the ground and feed it into the bale starting chamber 64 via the throat 66. The crop material is carried rearwardly by the floor roll 28 into engagement with the apron inner course 42a which carries it upwardly and forwardly into engagement with the rollers 30, 32, 34. The crop material is coiled in a counterclockwise direction as viewed in FIG. 1 to start a bale core. Continued feeding of crop material into the chamber 64 by the pickup tines 26 causes the apron inner course 42a of the belts 42 to expand in length around a portion of the bale core as the diameter thereof increases. The take up arms 56 rotate from their inner position shown in FIG. 1 toward their outer position shown in FIG. 2 to permit such expansion of the apron inner course 42a. When a full sized bale has been formed as shown in FIG. 2 and then wrapped with a suitable material such as twine or net, the tailgate 18 is opened by extending hydraulic cylinders 21 and the bale is ejected. Subsequent closing of the tailgate 18 returns the apron inner course 42a to the location shown in FIG. 1 since the arms 56 are returned to their inner positions shown in FIG. 1 by springs 63. The round baler 10 is now ready to form another bale.

It will be understood that during formation of the bale, sledge assembly 29 moves from its bale starting position of FIG. 1 to its full bale position of FIG. 2. This movement of the sledge assembly 29 causes the idler roller 40 to move in an arcuate path while maintaining the apron belts 42 in close proximity to the roller 34, thereby allowing the roller 34 to strip crop material from the apron belts 42. The idler roller 40 thus prevents the loss of crop material between the roller 34 and the belts 42 during formation of the bale. The sledge assembly 29 is pushed outwardly toward its full bale position during bale formation and is pulled inwardly toward its bale starting position during bale ejection without utilizing any additional mechanisms.

In an alternative embodiment (not shown) of the round baler 10, apron 41 consists of a pair of chains connected together at spaced intervals by transverse slats, and the idler roller 40 is replaced by a pair of idler sprockets engaged with the chains. Also in this alternative embodiment, the guide rolls 44, 46, 48, 50, 52, 55, 60 and 62 would be replaced with guide sprockets for engaging the apron chains, and the drive roll 54 would be replaced with drive sprockets.

In accordance with the present invention, a pair of hydraulic cylinders 68 are pivotally connected at their ends between lever arms 70 which are mounted on the cross shaft 58 and frame members 72 on the tailgate 18. The hydraulic cylinders 68 are preferably of the double acting type. One of the springs 63 and one of the hydraulic cylinders 68 are disposed on each side of the baler 10. As seen in FIG. 1, the longitudinal axes of the hydraulic cylinders 68 are inclined at an acute angle of approximately 30° to the longitudinal axes of the springs 63 at the start of bale formation. This angle of inclination between the hydraulic cylinders 68 and the springs 63 decreases to approximately 10° as seen in FIG. 2 when a full bale has been completed. During bale formation, the hydraulic cylinders 68 are extended in order to resist movement of the arms 56 from the inner positions shown in FIG. 1 to the outer positions shown in FIG. 2. This maintains tension in the apron 41 and thereby controls the density of bales formed in the baler 10. When the tailgate 18 is closed after ejecting a completed bale, the hydraulic cylinders 68 are contracted.

It will be understood that the springs 63 and the hydraulic cylinders 68 cooperate to comprise an apron tensioning method according to the present invention. The hydraulic cylinders 68 provide a primary source of tension on the apron 41 while the springs 63 provide a secondary source of tension on the apron 41 and assist the cylinders 68 during formation of the bale core and during the final stages of bale formation. The apron tension generated by the hydraulic cylinders 68 increases during bale formation while the apron tension generated by the springs 63 remains substantially constant during bale formation. This cooperation between the springs 63 and the hydraulic cylinders 68 ensures that bales formed in the baler 10 have dense cores and hard outer shells. Such bales are preferred because the dense cores prevent bales from sagging or squatting after formation and the hard outer shells help to shed water and thus prevent it from penetrating into the bales.

What is claimed is:

1. In a round baler having a main frame, a tailgate pivotally connected to said main frame, a sledge assembly including a plurality of rollers mounted on said main frame for movement between a bale starting position and a full bale position, an apron supported on take up means mounted in said main frame, said apron having an expandable inner course cooperating with the rollers of said sledge assembly to define a bale starting chamber when said sledge assembly is in said bale starting position, said take up means being movable from an inner position toward an outer position as the inner course of said apron expands, a method comprising the steps of:
  forming a core of a bale in said bale starting chamber while providing a primary source of tension in said apron by extending hydraulic means which is connected between said take up means and said tailgate; and
  completing formation of said bale while providing a secondary source of tension in said apron, in addition to said primary source of tension, by extending spring means which is connected between said take up means and said tailgate.

* * * * *